United States Patent [19]

Dean et al.

[11] Patent Number: 4,749,746

[45] Date of Patent: Jun. 7, 1988

[54] POLYMER COMPOSITION CONTAINING POLYCARBONATE, A STYRENIC/MALEIMIDE/CYCLIC ANHYDRIDE TERPOLYMER AND A TERPOLYMER GRAFTED TO A POLYMER MATRIX

[75] Inventors: Barry D. Dean, Broomall; Bi Le-Khac, West Chester, both of Pa.

[73] Assignee: ARCO Chemical Company, Newtown Square, Pa.

[21] Appl. No.: 933,509

[22] Filed: Jan. 15, 1987

Related U.S. Application Data

[63] Continuation of Ser. No. 736,914, May 22, 1985, abandoned.

[51] Int. Cl.$^4$ .............................................. C08L 69/00
[52] U.S. Cl. ...................................... 525/67; 525/73; 525/74; 525/75; 525/80; 525/279; 525/289

[58] Field of Search ........................................... 525/67

[56]         References Cited
U.S. PATENT DOCUMENTS 4,493,920  1/1985  Le Khac .............................. 525/67
4,564,654  1/1986  Serini et al. ........................... 525/67
4,621,117  11/1986  Wingler et al. ....................... 525/67

Primary Examiner—Jacob Ziegler
Attorney, Agent, or Firm—Dennis M. Kozak

[57]         ABSTRACT

A polymer composition which contains a polycarbonate resin, a styrenic/maleimide/cyclic anhydride terpolymer, and an ethylene/propylene/nonconjugated diene terpolymer chemically grafted with either styrene/acrylonitrile copolymer, methylmethacrylate/N-phenylmaleimide copolymer or polymethylmethacrylate is disclosed. The composition exhibits excellent impact strength properties upon molding.

1 Claim, No Drawings 4,749,746

POLYMER COMPOSITION CONTAINING POLYCARBONATE, A STYRENIC/MALEIMIDE/CYCLIC ANHYDRIDE TERPOLYMER AND A TERPOLYMER GRAFTED TO A POLYMER MATRIX

This is a continuation of application Ser. No. 736,914, filed 5/22/85, abandoned.

This invention relates to polymer compositions and, more specifically, to polymer compositions which exhibit excellent impact strength.

U.S. Pat. No. 4,493,920 teaches that the impact strength of polymer compositions of polycarbonate resins and styrene/N-phenylmaleimide/maleic anhydride terpolymers can be enhanced by chemically grafting the terpolymers to conjugated diene homopolymer rubbers or conjugated diene/styrenic copolymer rubbers.

The present invention provides polymer compositions which also contain polycarbonate resins and styrenic/maleimide/cyclic anhydride terpolymers but which achieve excellent impact strength through the incorporation thereinto of an ethylene-propylene-diene terpolymer chemically grafted with one of three polymer matrices which has been discovered to be thermodynamically miscible with either the polycarbonate resin, or the terpolymer or both. Accordingly, the polymer compositions of this invention attain excellent impact strength through a miscibility interaction of the polymer matrices. At equivalent levels of rubber, the polymer compositions of this invention exhibit enchanced impact strength upon molding as compared to the compositions of prior art which achieve their impact strength through rubber-polymer grafting.

According to this invention there is provided a polymer composition comprising: (A) from about 1 to about 99 weight percent of a thermoplastic polycarbonate resin based on bis-(hydroxyaryl)alkanes, (B) from about 99 to about 1 weight percent of a random terpolymer containing from about 70 to about 90 weight percent recurring units of a monovinyl aromatic monomer, from about 2 to about 24 weight percent recurring units of a maleimide monomer and from about 2 to about 24 weight percent recurring units of an $\alpha, \beta$ ethylenically unsaturated cyclic anhydride monomer; and, (C) from about 1 to about 20 parts per 100 parts by weight of (A)+(B) of from about 20 to about 80 weight percent of an ethylene/propylene/nonconjugated diene terpolymer grafted with from about 20 to about 80 weight percent of a polymer which is thermodynamically miscible with at least one of (A) and (B) selected from the group consisting of styrene/acrylonitrile copolymer, methyl methacrylate/N-phenylmaleimide copolymer and polymethylmethacrylate.

Also, according to this invention there is provided a method for producing a molded composition which comprises forming a polymer composition comprising: (A) from about 1 to about 99 weight percent of a thermoplastic polycarbonate resin based on bis-(hydroxyaryl)alkanes, (B) from about 99 to about 1 weight percent of a random terpolymer containing from about 70 to about 90 weight percent recurring units of a monovinyl aromatic monomer, from about 2 to about 24 weight percent recurring units of a maleimide monomer and from about 2 to about 24 weight percent recurring units of an $\alpha, \beta$ ethylenically unsaturated cyclic anhydride monomer; and, (C) from about 1 to about 20 parts per 100 parts by weight of (A)+(B) of from about 20 to about 80 weight percent of an ethylene/propylene/nonconjugated diene terpolymer grafted with from about 20 to about 80 weight percent of a polymer which is thermodynamically miscible with at least one of (A) and (B) selected from the group consisting of styrene/acrylonitrile copolymer, methyl methacrylate/N-phenylmaleimide copolymer and polymethylmethacrylate, and molding the resulting polymer composition.

According to this invention there is provided a molded composition comprising a continuous phase and a disperse phase within the continuous phase, the continuous phase comprising from about 1 to about 99 weight percent of a thermoplastic polycarbonate resin based on bis-(hydroxyaryl)alkanes and from about 99 to about 1 weight percent of a random terpolymer containing from about 70 to about 90 weight percent recurring unis of a monovinyl aromatic monomer, from about 2 to about 24 weight percent recurring units of a maleimide monomer and from about 2 to about 24 weight percent recurring units of an, ethylenically unsaturated cyclic anhydride, the disperse phase being an ethylene/propylene/non-conjugated diene terpolymer grafted with from about 20 to about 80 weight percent of a polymer which is thermodynamically miscible with at least one of said polycarbonate resin and said random terpolymer and which is part of the continuous phase, selected from the group consisting of styrene/acrylonitrile copolymer, methylmethacrylate/N-phenylmaleimide copolymer and polymethylmethacrylate.

According to this invention there is also provided a method of improving the impact strength properties of a polymmer composition upon molding which comprises incorporating into a continuous phase which comprises from about 1 to about 99 weight percent of a thermoplastic polycarbonate resin based on bis(hydroxyaryl)alkanes and from about 99 to about 1 weight percent of a random terpolymer containing from about 70 to about 90 weight percent recurring units of a monovinyl aromatic monomer, from about 2 to about 24 weight percent recurring units of a maleimide monomer and from about 2 to about 24 weight percent of an, ethylenically unsaturated cyclic anhydride, a disperse phase comprising an ethylene/propylene/non-conjugated diene terpolymer grafted with from about 20 to about 80 weight percent of a polymer which is thermodynamically miscible with at least one of said polycarbonate resin and said random terpolymer and which is part of the continuous phase, selected from the group consisting of styrene/acrylonitrile copolymer, methylmethacrylate/N-phenylmaleimide copolymer and polymethylmethacrylate, the ethylene/propylene/non-conjugated diene terpolymer grafted with said polymer being present in an amount within the range of from about 1 to about 20 parts per 100 parts by weight of said polycarbonate resin plus said random terpolymer.

The miscibility of polymers is generally determined using differential scanning calorimetry (DSC) to measure glass transition temperature. A thermodynamically miscible polymer composition will exhibit a single glass transition temperature value which typically lies intermediate between the glass transition temperatures of the individual polymeric components. Correspondingly, a partially miscible or immiscible composition will exhibit two or more glass transition temperature values. Accordingly, two or more polymers are said to be thermodynamically miscible when the free energy of mixing is negative. And, thermodynamic miscibility is said to exist when a mixture of two or more polymers results in a material exhibiting a single, well defined glass transition temperature.

Polycarbonates suitable to produce the polymer compositions of this invention are homopolycarbonates based on bisphenols having the general formula:

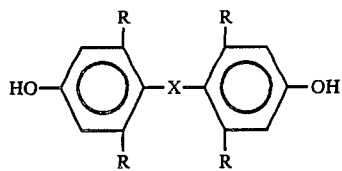

wherein each R separately represents hydrogen, a $C_1$ to $C_4$ alkyl group, chlorine or bromine and wherein X represents a direct bond $C_1$ to $C_8$ alkylene.

Polycarbonates having the above general formula include: 2,2-bis-(4-hydroxyphenyl)-propane; 2,2-bis(3-chloro-4-hydroxyphenyl)-propane; and 2,4-bis-(3,5-dimethyl-4-hydroxyphenyl)-2-methyl butane. Particularly suitable for use in the practice of this invention is 2,2-bis-(4-hydroxyphenyl)-propane.

The terpolymers suitable for use in this invention are random terpolymers having number average molecular weight ($\overline{Mn}$, as measured by gel permeation chromotography vs. monodisperse polystyrene) from about 50,000 to about 300,000, preferably 150,000 to about 250,000. Terpolymers suitable for use in this invention can be prepared by free radical polymerization in solution or in bulk and will comprise from about 70 to about 90 weight percent monovinyl aromatic monomer, from about 2 to 24 weight percent of maleimide and from 2 to about 24 weight percent of an $\alpha, \beta$ ethylenically unsaturated cyclic anhydride.

Suitable monovinyl aromatic monomers include styrene, α-methylstyrene, ethylstyrene, isopropylstyrene, t-butyl styrene, mono-, di- and tribromostyrenes, mono-, di- and trichlorostyrenes and their mixtures. Styrene is the preferred monovinyl aromatic monomer.

Suitable maleimide monomers include maleimide, N-phenylmaleimide, N-ethylmaleimide, N-(2-chlorophenyl)maleimide, N-(3-chlorophenyl)maleimide), N-(4-chlorophenyl)maleimide, N-(4-bromophenyl)maleimide, N-(2,4,6-tribromophenyl)maleimide, N-methylmaleimide, N-(4-t-butylphenyl)maleimide and the like and their mixtures. N-phenylmaleimide is the preferred maleimide.

Suitable $\alpha, \beta$ ethylenically unsaturated cyclic anhydrides include maleic anhydride, citraconic and itaconic anhydride. The preferred anhydride is maleic anhydride.

The ethylene/propylene/non-conjugated diene terpolymer (EPDM) rubber grafted with a polymer matrix which is thermodynamically miscible with the random S/N-PMI/MA terpolymer and/or polycarbonate will comprise from 20 to about 80% ethylene/propylene/-non-conjugated diene rubber and 80% to about 20% of a thermodynamically miscible copolymer matrix. The EPDM graft structures are preferably 40 to 60 percent by weight EPDM and 60 to 40 percent by weight of a thermodynamically miscible polymer matrix. The EPDM rubber should comprise 1 to 15 percent by weight of non-conjugated diene hydrocarbon and 85 to 99 percent by weight of a mixture of two mono olefins, ethylene and propylene. The preferred ratio of the mono olefins, ethylene and propylene should be 20/80 to 80/20, preferably between 35/65 to 65/35. Suitable non-conjugated dienes are 1,4-pentadiene, 1,4-hexadiene, 1,5-hexadiene, bicyclo[2,2,1] hepta-2,5-diene, dicyclopentadiene, tricyclopentadiene and tetra cyclopentadiene. Dicyclopentadiene is the most preferred non-conjugated diene monomer.

The graft polymer chemically attached to the EPDM is a polymer which exhibits thermodynamic miscibility with the random S/N-PMI/MA terpolymer and/or polycarbonate. Suitable polymers are styrene/acrylonitrile copolymers, poly(methylmethacrylate) and methylmethacrylate/N-phenylmaleimide copolymers.

Preferably, if a styrene/acrylonitrile copolymer is employed it will contain from about 22 to about 35 percent by weight of acrylonitrile.

Preferably, if a methylmethacrylate/N-phenylmaleimide copolymer is employed it will contain from about 10 to about 25 percent by weight N-phenylmaleimide.

The polymer compositions of this invention may be prepared using any suitable method of blending. Preferably, they are prepared by melt mixing at a temperature above the softening points of the polymers using any conventional high shear melt mixing apparatus, including twin screw extruders, single screw extruders and the like. The extrudate can be chopped into pellets and molded using any conventional method of molding including injection molding, roto-molding and the like.

The moldable compositions of this invention can also include other ingredients such as extenders, processing aids, pigments, mold release agents, and the like, for their conventionally employed purpose. Also, reinforcing fillers in amounts sufficient to import reforcement can be utilized, such as titanium dioxide, potassium titanate, and titanate whiskers, glass flakes and chopped glass fibers.

The following examples demonstrate the invention.

EXAMPLE 1

This example demonstrates the preparation of a styrene/N-phenylmaleimide/maleic anhydride terpolymer (hereinafter S/N-PMI/MA) (73/19/8 percent by weight) using a continuous single stirred tank reactor process.

The resulting terpolymer is suitable for use to produce polymer compositions of this invention.

A continuous stirred tank reactor polymerization was conducted using the following parameters:

| | |
|---|---|
| Styrene Feed: | 17.72 lbs/hr |
| N—PMI/MA(72/28) Feed: | 2.75 lbs/hr |
| Initiator[1]: | Di(4-t-butylcyclohexyl) peroxy dicarbonate |
| Initiator Flow Rate[2]: | 175 ml/hr |
| Temperature: | 70° C. |
| Residence Time: | 2.85 hr |
| Solids Level: | 36.2% |

[1]Percadox ® Initiator 16W70, Noury Chemical Corp.
[2]0.09 wt % initiator solution in styrene The polymer was recovered as pellets by devolatilization extrusion. Test specimens were prepared by injection molding with a pyromelt temperature of 305° C. The property values obtained are shown in Table I which follows Example XI.

EXAMPLE 2

This example demonstrates the preparation of a polycarbonate: S/N-PMI/MA blend.

Polycarbonate (Merlon M-50, Mobay Corp.) [550 grams] was melt compounded with S/N-PMI/MA terpolymer (Example 1, 450 grams) at 270° C. in a single screw extruder. Test specimens were prepared from the pellets by injection molding with a pyromelt temperature of 295° C. The property values obtained are shown in Table I.

EXAMPLE 3

This example demonstrates the thermodynamic miscibility parameters of (1) polycarbonate (Mobay's Merlon M-50), 2,2-bis-(4-hydroxyphenyl)-propane) with styrene/acrylonitrile copolymer (SAN), methylmethacrylate/N-phenylmaleimide copolymer (MMA/N-PMI) and polymethylmethacrylate (PMMA); and, (2) the S/N-PMI/MA terpolymer produced using the procedure of Example 1 with SAN, MMA/N-PMI and PMMA.

A 50:50 mixture of each polymer pair (10 grams total) was separately dissolved in tetrahydrofuran (200 grams) followed by precipitation into methanol. Each polymer powder was separately dried and analyzed by differential scanning calorimetry. The data below illustrate that a single glass transition temperature intermediate to the glass transition temperatures of the blend components was observed for four of the six pairs, indicating thermodynamic miscibility.

|  | Polycarbonate (Tg = 154° C.) | S/N—PMI/MA (Tg = 166° C.) |
|---|---|---|
| SAN(Tg = 109° C.) | 113,154 | 136.5 |
| PMMA(Tg = 107° C.) | 107,154 | 136 |
| MMA/N—PMI(Tg = 142° C.) | 147 | 150.5 |

From the above data, it is evident that SAN, PMMA and MMA/N-PMI are thermodynamically miscible with the S/N-PMI/MA terpolymer (Example 1), that PMMA and SAN are immiscible with polycarbonate, and that MMA/N-PMI is thermodynamically miscible with polycarbonate.

EXAMPLE 4

This Example serves to demonstrate the preparation of an EPDM terpolymer grafted with poly(methylmethacrylate).

A 4-liter resin kettle was charged with 400 grams of an ethylene/propylene/dicyclopentadiene terpolymer and 2700 grams of chlorobenzene by heating to 70° C. The resin kettle was charged with 120 grams of a 40% anhydrous t-butyl hydroperoxide/toluene solution, 20 grams of a 6% cobalt solution as cobaltous napthenate in mineral spirits and 1.7 grams of cobaltous acethylacetonate dissolved in 22 milliliters of tetrahydrofuran. The reaction mixture was maintained at 70°-72° C. for eight hours. The EPDM rubber solution was precipitated into a threefold excess of methanol using a high-speed Waring blender for agitation. The EPDM terpolymer was dried in vacuo at 25° C., dissolved in toluene and precipitated into methanol a second time. The peroxidized terpolymer rubber was dried in vacuo at 25° C. for 48 hours. The level of active oxygen was 1172 ppm.

Approximately 200 grams of peroxidized EPDM were dissolved in 350 grams of chlorobenzene in a 3-pint pressure reactor. Once all the rubber was dissolved, 200 grams of methylmethacrylate monomer were added to the reactor and the temperature raised to 132° C. for six hours. The polymer mass was precipitated in a threefold excess of methanol using a Waring blender. The polymer crumb obtained was dried under vacuum at 100° C. The total of EPDM-g-PMMA recovered was 384 grams (96% conversion). Soxhlet extraction of 13 grams of the EPDM-g-PMMA with methylethyl ketone for 118 hours revealed 2.7 grams of non-grafted PMMA (46.9%) with peak molecular weight of 209,000. The level of PMMA grafted to the EPDM terpolymer was 53.1%. The glass transition temperature of both the grafted and non-grafted PMMA was 101.5° C.

EXAMPLE 5

This example serves to demonstrate the preparation of an EPDM terpolymer grafted with styrene/acrylonitrile copolymer.

Approximately 200 grams of peroxidized EPDM (as prepared in Example 4) were dissolved in 400 grams of chlorobenzene in a 3-pint reactor. Once all the terpolymer was dissolved, 200 grams of a styrene monomer:acrylonitrile monomer mixture (76:24 wt%) was charged. The reactor temperature was raised to 135° C. for 6.4 hours. The polymer mass was precipitated in a threefold excess of methanol. The polymer crumb obtained was dried under vacuum at 100° C. The total of EPDM-g-SAN recovered was 365 grams (91% conversion). Soxhlet extraction of 15 grams of EPDM-g-SAN with methyl ethyl ketone for 112 hours revealed 3.71 grams of non-grafted SAN (55%) with peak molecular weight of 169,700 and acrylonitrile content of 23.6% by weight. The level of SAN grafted to the EPDM terpolymer was 45%. The glass transition temperature of both the grafted and non-grafted SAN was 107.5° C.

EXAMPLE 6

This example serves to demonstrate the preparation of an EPDM terpolymer grafted with methyl methacrylate/N-phenylmaleimide copolymer.

Approximately 200 grams of peroxidized EPDM (as prepared in Example 4) were dissolved in 378 grams of chlorobenzene in a 3-pint reactor. Once all the rubber had dissolved, 47 grams of N-phenylmaleimide and 153 grams of methyl methacrylate were added and the temperature raised to 140° C. for 6.5 hours. The polymer mass was precipitated into a four-fold excess of methanol using a Waring blender. The polymer crumb obtained was dried under vacuum at 110° C. The total EPDM-g-MMA/N-PMI recovered was 397 grams (99.2% conversion). Soxhlet extraction of 25 grams of the EPDM-g-MMA/N-PMI with methyl ethyl ketone for 122 hours revealed 5.8 grams (47%) of non-grafted MMA/N-PMI with a peak molecular weight of 188,000. The level of MMA/N-PMI grafted to the EPDM terpolymer was 53%. The glass transition temperature of both the grafted and non-grafted MMA/N-PMI was 142.5% C. The MMA/N-PMI copolymer grafted to the EPDM terpolymer contained 23.5% by weight of N-phenylmaleimide.

EXAMPLE 7

This example demonstrates the preparation of a polymer composition of this invention comprising a thermoplastic polycarbonate, a S/N-PMI/MA terpolymer and an EPDM-g-PMMA.

Approximately 550 grams of Merlon M-50 polycarbonate, 450 grams of S/N-PMI/MA terpolymer (Example 1) and 100 grams of EPDM-g-PMMA (Example 4) were physically mixed and extruded into pellets on a single screw extruder at a temperature of 270° C. Test specimens were prepared by injection molding with a pyromelt temperature of 285° C. The property values obtained are shown in Table I below.

EXAMPLE 8

This example demonstrates the preparation of a polymer composition of this invention, comprising a thermoplastic polycarbonate, a S/N-PMI/MA terpolymer and an EPDM-g-SAN.

Approximately 550 grams of Merlon M-50 polycarbonate, 450 grams of S/N-PMI/MA terpolymer (Example 1) and 100 grams of EPDM-g-SAN (Example 5) were physically mixed and extruded into pellets on a single screw extruder at a temperature of 270° C. Test specimens were prepared by injection molding with a pyromelt temperature of 280° C. The Table below sets forth the values obtained.

EXAMPLE 9

This example demonstrates the preparation of a polymer composition of this invention, comprising a thermoplastic polycarbonate, a S/N-PMI/MA terpolymer and an EPDM-g-MMA/N-PMI.

Approximately 550 grams Merlon M-50 polycarbonate, 450 grams of S/N-PMI/MA terpolymer (Example 1) and 100 grams of EPDM-g-MMA/N-PMI (Example 6) were physically mixed and extruded into pellets on a single screw extruder at a temperature of 275° C. Test specimens were prepared by injection molding with a pyromelt temperature of 285° C. The property values obtained are shown in Table 3, below.

EXAMPLE 10

This example demonstrates the preparation of a polymer composition according to the teachings of U.S. Pat. No. 4,493,920 and is included herein for comparative purposes.

A 1-gallon reactor was charged wit 92.8 grams of Stereon ® 720 rubber (90% butadiene 10% styrene) commercially available from Firestone Synthetic Rubber and Latex Company and 1,000 grams of styrene monomer. Once the rubber had dissolved, dropwise addition of a solution comprising 827 grams of styrene monomer, 189 grams of N-phenylmaleimide, 92.4 grams of maleic anhydride and 1.6 grams of benzoyl peroxide was started while raising the temperature of the reactor to 92° C. Once all the monomer solution had been added, the polymerization reaction was terminated at 43.5% conversion by the addition of 0.4 grams of hydroquinone. The polymer (957 grams) was recovered by precipitation into methanol. The glass transition temperature of the polymer an analyzed by differential scanning calorimetry was 168.5° C. The terpolymer was analyzed and found to contain 21.8% by weight N-PMI and 10.5% by weight maleic anhydride. The number average molecular weight (Mn) as determined by gel permeation chromotography (vs monodispere polystyrene) was 137,600.

Approximately 550 grams of Merlon M-50 polycarbonate, 450 grams of the above rubber modified S/N-PMI/MA terpolymer and 5 grams of Ethanox ® 330 antioxidant (Ethyl Corporation) were physically mixed and extruded into pellets on a single screw extruder at a temperature of 270° C. Test specimens were prepared by injection molding with a pyromelt temperature of 285° C. Table I below sets forth the property values obtained.

EXAMPLE 11

This example demonstrates the preparation of a polymer composition according to the teachings of U.S. Pat. No. 4,493,920 and is included herein for comparative purposes.

A 1-gallon reactor was charged with 185.6 grams of Stereon ® 720 rubber commercially available from Firestone Synthetic Rubber and Latex Company and 1,000 grams of styrene monomer. Once all the rubber had dissolved, dropwise addition of a solution comprising 727 grams of styrene monomer, 169 grams of N-phenylmaleimide, 82.4 grams of maleic anhydride and 1.7 grams of benzoyl peroxide was started while raising the temperature of the reactor to 90° C. Once all the monomer solution had been added, the polymerization reaction was terminated at 43.8% conversion by the addition of 0.4 grams of hydroquinone.

The polymer (960 grams) was recovered by a precipitation into methanol. The glass transition temperature of the polymer, as analyzed by differential scanning calorimetry, was 170.5° C. The polymer analyzed for 21.8% by weight N-phenylmaleimide and 11% by weight maleic anhydride. The number average molecular weight as determined by gel permeation chromatography (vs. monodisperse polystyrene) was 141,000.

Approximately 550 grams of Merlon M-50 polycarbonate, 450 grams of the above rubber-modified S/N-PMI/MA terpolymer and 5.5 grams of Ethanox ® 330 antioxidant were physically mixed and extruded into pellets on a single screw extruder at a temperature of 270° C. Test specimens were prepared by injection molding with a pyromelt temperature of 285° C. Table I below sets forth the property values obtained.

TABLE I

| | | EXAMPLE NO. | | | | | | |
| | | CONTROLS | | INVENTION | | | PRIOR ART | |
| Property | ASTM No. | 1 | 2 | 7 | 8 | 9 | 10 | 11 |
| --- | --- | --- | --- | --- | --- | --- | --- | --- |
| Molecular Weight (Mn) | — | 158,000 | — | — | — | — | — | — |
| % Rubber[1] | — | 0 | 0 | 4.7 | 4.7 | 4.7 | 4.7 | 9.5 |
| Tg (°C.) (DSC) | — | 166 | 147.5 | 146.5 | 147 | 148 | 147.5 | 147 |
| Tensile Str. (psi) | D-638 | 6,482 | 10,070 | 9,230 | 9,280 | 9,120 | 8,800 | 8,053 |
| Flexural Mod. (psi) | D-790 | 499,350 | 393,700 | 386,500 | 387,200 | 387,700 | 385,700 | 353,900 |
| Notched Izod (ft-lbs/in) | D-256 | 0.6 | 1.0 | 8.4 | 9.1 | 12.2 | 1.8 | 6.2 |
| GFWI (in-lbs)[2] | — | <1 | 230 | 480+ | 480+ | 480+ | 360 | 440 |
| Tensile Impact[3] | D-1822 | 7 | 37 | 91 | 94 | 104 | 44 | 51 |

TABLE I-continued

| Property | ASTM No. | CONTROLS | | INVENTION | | | PRIOR ART | |
|---|---|---|---|---|---|---|---|---|
| | | 1 | 2 | 7 | 8 | 9 | 10 | 11 |
| (ft-lbs/in²) | | | | | | | | |

[1] % rubber is the weight percent of rubber in the final composition
[2] 1¼" diameter orifice and an 8 pound ½" diameter weight
[3] Samples aged in a circulating air oven at 130° C. for 120 hours Examples 1 and 2 are control examples showing the properties of the S/N-PMI/MA terpolymer (Example 1) and the polycarbonate: S/N-PMI/MA terpolymer blend (Example 2).

Examples 7, 8 and 9 are polymer compositions of this invention. Example 7 is a polymer composition of polycarbonate, a S/N-PMI/MA terpolymer and an EPDM-g-PMMA. Example 8 is a polymer composition of polycarbonate, a S/N-PMI/MA terpolymer and an EPDM-g-SAN. Example 9 is a polymer composition of polycarbonate, a S/N-PMI/MA terpolymer and an EPDM-g-MMA/N-PMI.

Examples 10 and 11 are comparative examples demonstrating the prior art teachings of U.S. Pat. No. 4,493,920.

The above data clearly show the marked improvement in impact properties obtained by the invention.

It will be evident from the foregoing that various modifications can be made to this invention. Such, however, are considered as being within the scope of the invention.

What is claimed is:

1. A polymer composition comprising: (A) from about 1 to about 99 weight percent of a thermoplastic polycarbonate resin based on bis-(hydroxyaryl)alkanes, (B) from about 99 to about 1 weight percent of a random terpolymer containing from about 70 to about 90 weight percent recurring units of a monovinyl aromatic monomer, from about 2 to about 24 weight percent recurring units of a maleimide monomer, and from about 2 to about 24 weight percent recurring units of an $\alpha, \beta$ ethylenically unsaturated cyclic anhydride monomer; and (C) from about 1 to about 20 parts per 100 parts by weight of (A)+(B) of from about 20 to about 80 weight percent of an ethylene/propylene/non-conjugated diene terpolymer grafted with from about 20 to about 80 weight percent styrene/acrylonitrile copolymer containing from about 22 to about 35 percent by weight acrylonitrile, said styrene/acrylonitrile copolymer being thermodynamically miscible with at least one of (A) and (B).

* * * * *